(12) United States Patent
Berens

(10) Patent No.: US 8,340,229 B2
(45) Date of Patent: Dec. 25, 2012

(54) METHOD AND APPARATUS FOR REDUCING THE INTERFERENCES BETWEEN A WIDEBAND DEVICE AND A NARROWBAND DEVICE INTERFERING WITH THE WIDEBAND DEVICE

(75) Inventor: Friedbert Berens, Geneva (CH)

(73) Assignee: Stmicroelectronics SA, Montrouge (FR)

( * ) Notice: Subject to any disclaimer, the term of this patent is extended or adjusted under 35 U.S.C. 154(b) by 1029 days.

(21) Appl. No.: 11/994,135

(22) PCT Filed: Jun. 26, 2006

(86) PCT No.: PCT/EP2006/006128
§ 371 (c)(1),
(2), (4) Date: Dec. 28, 2007

(87) PCT Pub. No.: WO2007/003298
PCT Pub. Date: Jan. 11, 2007

(65) Prior Publication Data
US 2008/0205544 A1    Aug. 28, 2008

(30) Foreign Application Priority Data

Jun. 30, 2005    (EP) .................................... 05014160

(51) Int. Cl.
H04B 14/06    (2006.01)
(52) U.S. Cl. ........................................ 375/346; 375/316
(58) Field of Classification Search .................. 375/346
See application file for complete search history.

(56) References Cited

U.S. PATENT DOCUMENTS

| | | | | |
|---|---|---|---|---|
| 4,879,606 A | * | 11/1989 | Walter et al. .................. | 386/308 |
| 5,287,180 A | * | 2/1994 | White ........................... | 348/484 |
| 5,758,275 A | * | 5/1998 | Cox et al. ...................... | 455/307 |
| 6,084,919 A | * | 7/2000 | Kleider et al. ................. | 375/285 |
| 6,490,314 B1 | * | 12/2002 | Khayrallah et al. ........... | 375/132 |
| 6,510,147 B1 | * | 1/2003 | Sun et al. ....................... | 370/335 |
| 6,570,527 B1 | * | 5/2003 | Lindskog et al. ............. | 342/174 |
| 6,574,266 B1 | * | 6/2003 | Haartsen ........................ | 375/133 |
| 6,952,594 B2 | * | 10/2005 | Hendin ....................... | 455/552.1 |
| 7,171,161 B2 | * | 1/2007 | Miller ......................... | 455/67.11 |
| 7,342,973 B2 | * | 3/2008 | Walker et al. ................. | 375/260 |
| 7,643,811 B2 | * | 1/2010 | Reunamaki et al. ........ | 455/226.2 |
| 2003/0064739 A1 | * | 4/2003 | Lindskog et al. ............. | 455/504 |
| 2003/0198283 A1 | * | 10/2003 | Patel et al. .................... | 375/147 |

(Continued)

OTHER PUBLICATIONS

Heydari, A Study of Low-Power Ultra Wideband Radio Transceiver Architectures, Wireless Communications and Networking Conference, Mar. 13-17, 2005, pp. 758-763.

(Continued)

*Primary Examiner* — David Ometz
*Assistant Examiner* — Santiago Garcia
(74) *Attorney, Agent, or Firm* — Allen, Dyer, Doppelt, Milbrath & Gilchrist, P.A.

(57) ABSTRACT

The method includes an interference deduction mode for reducing interferences between a wideband device and a narrowband device. The method is performed within the wideband device and includes detecting an emission from and/or a reception performed by the narrowband device; determining from the detection step a group of at least one sub-carrier having frequencies interfering with the narrowband devices; and frequency shifting at least a part of frequency band of the wideband device including the group of at least one interfering sub-carriers with a chosen frequency shift such that at least a part of frequency band of the narrowband device is excluded from the frequency band of the wideband device.

29 Claims, 8 Drawing Sheets

U.S. PATENT DOCUMENTS

| | | |
|---|---|---|
| 2004/0028011 A1* | 2/2004 | Gehring et al. ............... 370/330 |
| 2004/0081127 A1* | 4/2004 | Gardner et al. ............... 370/338 |
| 2004/0233972 A1* | 11/2004 | Karaoguz ..................... 375/130 |
| 2005/0201498 A1* | 9/2005 | Nakai ........................... 375/346 |
| 2006/0014506 A1* | 1/2006 | Haartsen ....................... 455/227 |
| 2006/0083338 A1* | 4/2006 | Giannakis et al. ............ 375/343 |
| 2006/0252373 A1* | 11/2006 | Huh et al. .................... 455/41.2 |
| 2007/0110198 A1* | 5/2007 | Skarby et al. ................ 375/349 |
| 2008/0037611 A1* | 2/2008 | Coon ............................ 375/145 |
| 2008/0297415 A1* | 12/2008 | Berens et al. ................ 342/372 |
| 2009/0088092 A1* | 4/2009 | Wang et al. ................ 455/114.2 |
| 2009/0110033 A1* | 4/2009 | Shattil ........................... 375/141 |
| 2009/0147832 A1* | 6/2009 | Kim et al. ..................... 375/144 |
| 2009/0161774 A1* | 6/2009 | Liu et al. ....................... 375/260 |
| 2009/0252096 A1* | 10/2009 | Liu et al. ....................... 370/329 |

OTHER PUBLICATIONS

Patent Abstracts of Japan, vol. 2003, No. 12, Dec. 5, 2003 & JP2005150945.

* cited by examiner

METHOD AND APPARATUS FOR REDUCING THE INTERFERENCES BETWEEN A WIDEBAND DEVICE AND A NARROWBAND DEVICE INTERFERING WITH THE WIDEBAND DEVICE

FIELD OF THE INVENTION

The present invention relates to wireless communication systems, and, more particularly, to the processing of interference within different wireless communication apparatuses.

A non-limiting application of the invention is directed to devices operating according to the Ultra Wideband (UWB) standard, based on Orthogonal Frequency-Division Multiplexing (OFDM), called Multiband OFDM Alliance (MBOA), that can generate interference toward a WIMAX device, which is a fixed wireless device (Worldwide Interoperability for Microwave Access). Such a WIMAX device operates, for example, with a bandwidth of 20 MHz at a central frequency of 3.5 GHz, whereas the frequency band of the MBOA system lies between 3.1 and 5.0 GHz.

BACKGROUND OF THE INVENTION

Wireless personal area networks based on OFDM and UWB technologies, like the MBOA standard, may directly interfere with narrowband devices which are close to such wideband devices. At present, no specific interference mitigation techniques are implemented in the UWB standard based on OFDM (MBOA)

Orthogonal Frequency-Division Multiplexing (OFDM) is a method of digital modulation in which a signal is split into several narrowband channels (sub-carriers) at different frequencies. In order to avoid in-band spectral interference, WO 2005/006698 (INTEL) proposes to puncture, i.e. remove, selected sub-carriers. More precisely, this puncturing is made, taking into account channel knowledge, after the OFDM modulation in the transmitter, whereas a depuncturing is performed in the receiver before the OFDM demodulator. Because of the puncturing of some sub-carriers, the size of the encoded block of data which may be converted into OFDM symbols, is reduced. Consequently, the data rate and the available resources on air have to be reduced, leading to a loss of communication performance.

SUMMARY OF THE INVENTION

An object of the invention is to reduce or minimize the interference to and from an in-band victim device without reducing the available resources on the air and the data rate, thus leading to no loss of communication performance.

A method is proposed for reducing the interferences between a main device, for example, a UWB MBOA device, adapted to transmit information on sub-carriers having frequencies belonging to a main band of frequencies, and at least one auxiliary device, for example a WIMAX device, adapted to emit and/or receive information within an auxiliary band of frequencies. The auxiliary band is narrower than the main band and is included within the main band.

According to this embodiment, the method comprises an interference reduction mode for reducing the interference between the main device and the auxiliary device. The interference reduction mode is performed within the main device and includes detecting an emission from, and/or a reception performed by, the at least one auxiliary device; determining from the detection step a group of at least one sub-carrier having a frequency interfering with the auxiliary band of frequencies; and frequency shifting at least a part of the main band of frequencies, including the group of at least one interfering sub-carriers, with a chosen frequency shift such that at least a part of the auxiliary band is excluded from the main band of frequencies.

One skilled in the art may adapt the frequency shift depending on the case, more particularly on the width of the auxiliary band, the location of the auxiliary band within the main band, and the characteristics of the main band. For example, the greatest possible frequency shift may lead to a frequency shifting which is not enough to eliminate all interfering frequencies from the main band used by the main device and thus eliminating all the interference, but enough to reduce the interference between the main device and the auxiliary device.

In another example, where the auxiliary band is located near the limit of the main band, the frequency shift may be chosen such that the whole auxiliary band is excluded from the main band of frequencies. Of course, when the main band of frequencies is delimited by upper and lower limits (for example, for a UWB MBOA based device), one skilled in the art may adapt the frequency shift such that, after shifting, the shifted part remains within the limits of the main band while being compatible with the non-shifted part of the main band of frequencies. The frequency shift is, for example, at least equal to the width of the frequency band of the at least one auxiliary device.

When the main band of frequencies is subdivided into several different mutually spaced sub-bands, the shifting step may comprise shifting at least the sub-band, which contains at least a part of the group of interfering sub-carriers. For example, a 20 MHz narrowband carrier, which can be the width of the auxiliary band of the auxiliary device (for example, the WIMAX device), corresponds to only 1.3% of the used UWB spectrum of a MBOA based device and corresponds to an interfering sub-carrier group of 5 or 7 sub-carriers.

Whereas the wideband device generates interference towards the narrowband interferer, there is also an in-band interference generated by the narrowband interferer in the wideband device even if it is less important. With this embodiment, it is possible to minimize such interferences generated by the narrowband interferer toward the wideband device.

The main device may comprise generally a transmission chain, containing a radio frequency stage including controllable transposition means or circuitry, and the frequency shifting step comprises advantageously modifying the transposition frequency of the transposition means.

According to one embodiment, the detecting step of the interference reduction mode comprises analyzing channel step information and detecting the operation of the at least one auxiliary device from the channel state information. Such channel state information can be delivered by a channel estimator, which may be incorporated in the wireless apparatus. However, the detecting step may further comprise checking the operation detection by using a set of stored interference information respectively associated with a set of several different auxiliary devices.

In other words, to optimize the shifting process, the spectral properties of the potential the auxiliary device can be taken into account in the definition process of the frequency shift. Usually, only a limited amount of possible devices can be assumed to be victim devices in the corresponding transmission band of the main device. These devices (e.g. WIMAX devices) are well defined, and, thus, the bandwidth and the potential carrier frequencies in use are well known. By using this information, it is much easier to define the sub-carriers to be shifted based on the channel state information. Using this knowledge, groups can be predefined and easily set up. For example, a sub-carrier group of 5 or 7 sub-carriers can be defined for a WIMAX device with a bandwidth of 20 MHz. The requirements on the frequency domain channel state information can thus be relaxed.

The interference reduction mode advantageously comprises regularly checking the operation of the auxiliary device and, if the auxiliary device is not detectable, the interference reduction mode concerning the not detectable auxiliary device is stopped.

According to a different embodiment, the main device and the at least one auxiliary device are incorporated within a single wireless communication apparatus. Thus, with such an embodiment, it is possible to have the simultaneous operation of two different air interfaces within a single wireless apparatus, for example a single mobile terminal, while the mutual interferences are minimized if not eliminated.

With such a colocation variant, an indication of the group of at least one sub-carrier having frequency interfering with the auxiliary band of frequencies of the auxiliary device is advantageously stored within the apparatus. The detecting step of the interference reduction mode comprises advantageously receiving from the auxiliary device auxiliary control information, representative of the operation or of the non-operation of the auxiliary device, such that the interference reduction mode is performed only during the operation of the auxiliary device.

Several different auxiliary devices may be respectively adapted to emit and/or receive information within several different auxiliary frequency bands, each auxiliary band being narrower than the main band and included within the main band. In such a case, the interference reduction mode may be performed for at least some of the several different auxiliary devices, provided that the chosen frequency shift is compatible with the characteristics of the main band and with the several auxiliary bands.

The main device can belong to a multi-carrier based Ultra Wideband Communication system, for example an OFDM based Ultra Wideband Communication system. The at least one auxiliary device may belong to a fixed wireless access system (FWA), like a WIMAX system. However, the auxiliary device may also belong to a mobile radio system defined by a mobile radio standard such as UMTS, GSM, CDMA, EDGE, beyond IMT-2000 systems, or to a fixed satellite system (FSS).

According to another embodiment, a wireless communication apparatus comprises a main device including a transmission chain for transmitting information on sub-carriers using frequencies belonging to a main band of frequencies. The main device further includes interference reduction means or circuitry for reducing the interference between the main device and the at least one auxiliary device adapted to emit and/or receive information within an auxiliary band of frequencies. The auxiliary band may be narrower than the main band and included within the main band. The interference reduction means may include detecting means or circuitry for detecting an emission from and/or a reception performed by the at least one auxiliary device, a control unit connected to the detecting means for determining a group of at least one sub-carrier having frequencies interfering with the auxiliary band of frequencies and for frequency shifting at least a part of the main band of frequencies, including the group with a chosen frequency shift, such that at least a part of the auxiliary band is excluded from the main band of frequencies When the main band of frequencies is subdivided into several different mutually spaced sub-bands, the additional control unit is adapted to shift at least the sub-band which contains at least a part of the group of interfering sub-carriers.

According to another embodiment, the transmission chain comprises a radio frequency stage including controllable transposition means or circuitry, and the control unit is adapted to modify the transposition frequency of the transposition means for performing the frequency shifting.

According to another embodiment, the apparatus further comprises a channel estimation unit adapted to deliver channel state information, and the detection means comprises means or circuitry for analyzing the channel state information and detecting the operation of the at least one auxiliary device from the channel state information.

Memory means or a memory may be provided for storing a set of interference information respectively associated with a set of several different auxiliary devices, and checking means or circuitry may check the operation detection by using the stored set of interference information. A management unit may be provided for managing the operation of the additional interference reduction means. The interference reduction means may be further adapted to regularly check the operation of the auxiliary device and, if the auxiliary device is not detectable, the management unit is adapted to stop the interference reduction concerning the non-detectable auxiliary device.

When the main device and the at least one auxiliary device are incorporated together within a single wireless communication apparatus, according to one embodiment, the apparatus comprises a management unit adapted to manage the operation of the additional interference reduction means, and memory means for storing an indication of the group of at least one sub-carrier having frequencies interfering with the auxiliary band of frequencies of the auxiliary device. The auxiliary device comprises auxiliary control means for delivering auxiliary control information representative of the operation or of the non-operation of the auxiliary device such that the management unit is adapted to allow the operation of the interference reduction means only during the operation of the auxiliary device.

BRIEF DESCRIPTION OF THE DRAWINGS

Other advantages and features of the invention will become clear upon reading of the detailed description of the embodiments, and of the appended drawings in which.

DETAILED DESCRIPTION OF THE PREFERRED EMBODIMENTS

Figure 1:
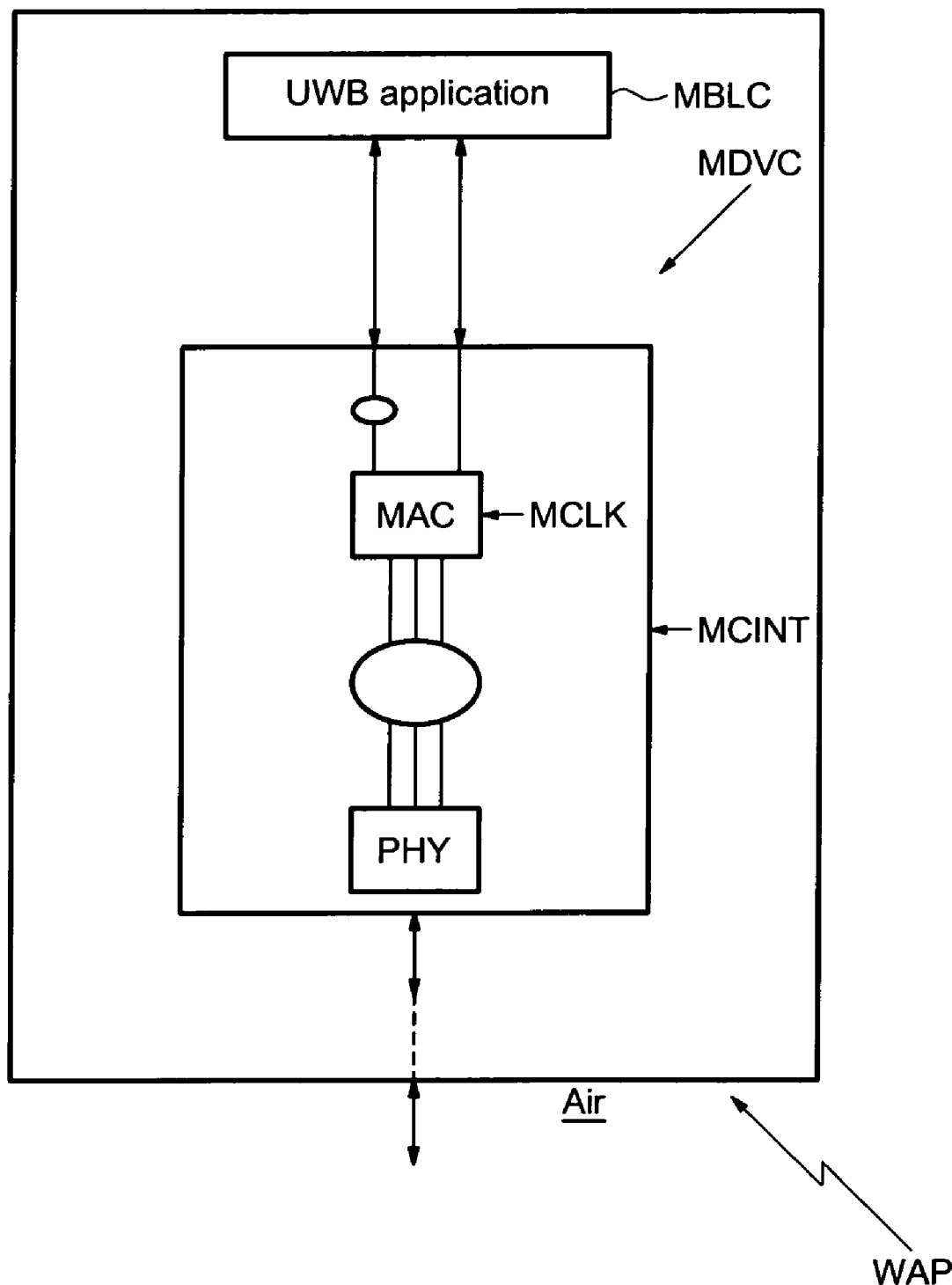
FIG. 1 illustrates the internal protocol structure of a wireless communication apparatus according to an embodiment of the invention.

FIG. 1 discloses an example of a wireless communication apparatus WAP belonging to a non-coordinated communication system such as a WLAN ("Wireless Local Area Network") or a WPAN ("Wireless Personal Area Network").

Such a wireless apparatus WAP belongs, for example, to an OFDM based Ultra Wideband Communication system. However, the apparatus is not limited to such an example and can apply to more generalized multi-carrier (GMC) systems in which the carriers are not necessarily orthogonal.

WPAN MAC protocols have a distributed nature where there is no central coordinating terminal or base station to assign the medium access. Therefore, in contrast to a mobile radio terminal, a WPAN transceiver has greater flexibility to allocate the transmission slot and formats. The allocation of the communication resources is a distributed process. The allocation to a specific time slot in the superframe can be modified from one superframe to the next. The controlling entity is the WPAN MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received, and network wide constraints like the already existing slot reservation.

An example of a distributed WPAN MAC is a MBOA MAC. The MBOA MAC standard draft is based on UWB technology and is planned to be used in the frequency band between 3.1 and 10.7 GHz. The first implementations using the standard work in the frequency range between 3.1 and 5.0 GHz.

The wireless apparatus comprises a main device MDVC including an OFDM based UWB communication interface MCINT connected between the UWB application block MBLC and the air channel. This communication interface MCINT comprises an UWB MAC layer clocked by a clock signal MCLK and connected to the PHY layer and to the UWB application block MBLC.

For further details concerning the MAC layer and the PHY layer of the communication interface MCINT, one skilled in the art may refer to MBOA PHY layer Technical Specification, Version 1.0, January 2005, and to MBOA MAC layer Technical Specification, Version 0v7, October 2004.

Figure 2:
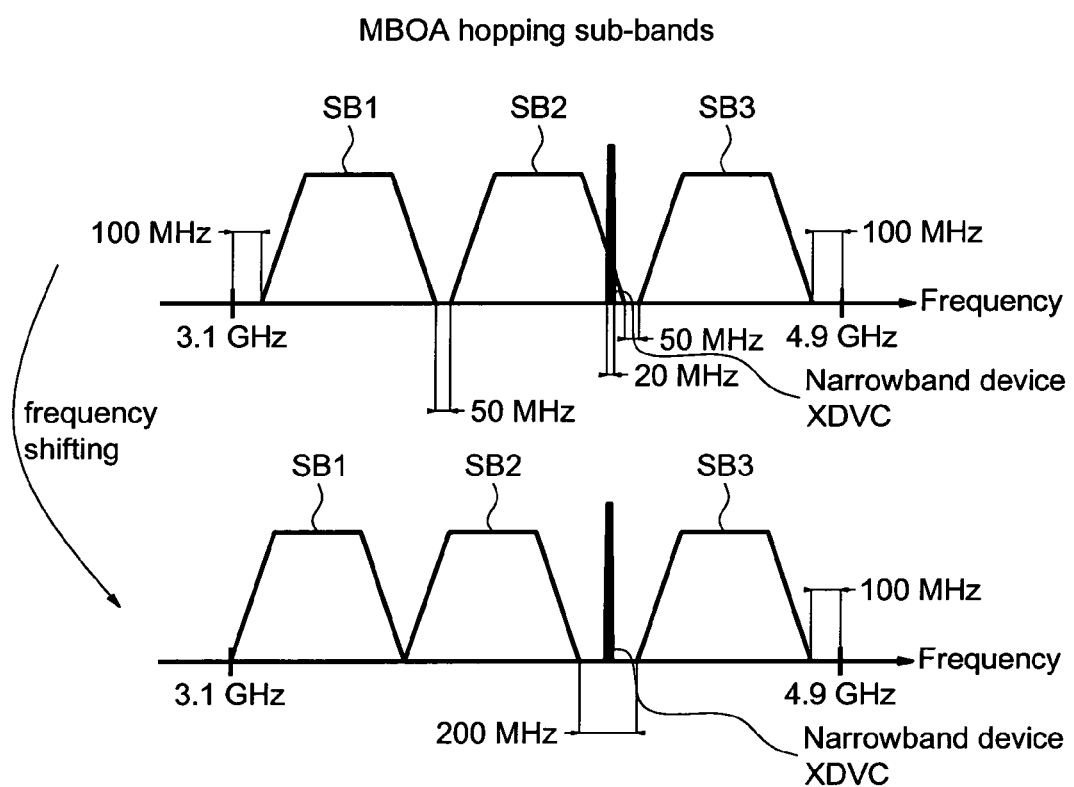
FIG. 2 illustrates a first embodiment of a method according to the invention.

The MAC layer manages in particular the emission/reception of the UWB data stream and is incorporated by software in a control processor. In FIG. 2 it can be seen that the main band of frequencies used for the operation (transmission and/or reception) of the main device MDVC lies between 3.1 and 4.9 GHz. Further, the main frequency band is subdivided into three sub-bands SB1, SB2, SB3, called hopping sub-bands, which are mutually spaced. More precisely, there is a guard interval of 100 MHz between the lower limit (3.1 GHz) of the main frequency band and the beginning of the first sub-band SB1, as well as between the end of the third sub-band SB3 and the upper limit (4.9 GHz) of the main frequency band.

Furthermore, two adjacent sub-bands are spaced by a guard interval of 50 MHz.

The allocation of the sub-bands during the transmission is made according to a predetermined hopping sequence. In the upper part of FIG. 2, a narrowband device (auxiliary device) XDVC is assumed to operate in an auxiliary band of frequencies included within the second sub-band SB2. This auxiliary band of frequencies has a width of 20 MHz.

Compared to a UWB device based on techniques like MBOA standard, such a device XDVC is considered to be a narrowband device.

According to one embodiment, which will be described in greater detail below based on the control of the transmission chain of the UWB main device MDVC and on frequency shifting, the interference reduction is controlled in the example depicted in FIG. 2, by changing the carrier frequencies of the hopping sub-bands by moving the two lower bands slightly lower in the frequency domain.

As a matter of fact, the narrowband interferer XDVC lies here near the end of the second sub-band SB2. Thus, by shifting the sub-band SB1 with a shift of 100 MHz towards the low frequencies and by shifting sub-band SB2 with a shift of 150 MHz towards the low frequencies, the narrowband interferer XDVC lies now between sub-band SB2 and sub-band SB3.

Figure 3:
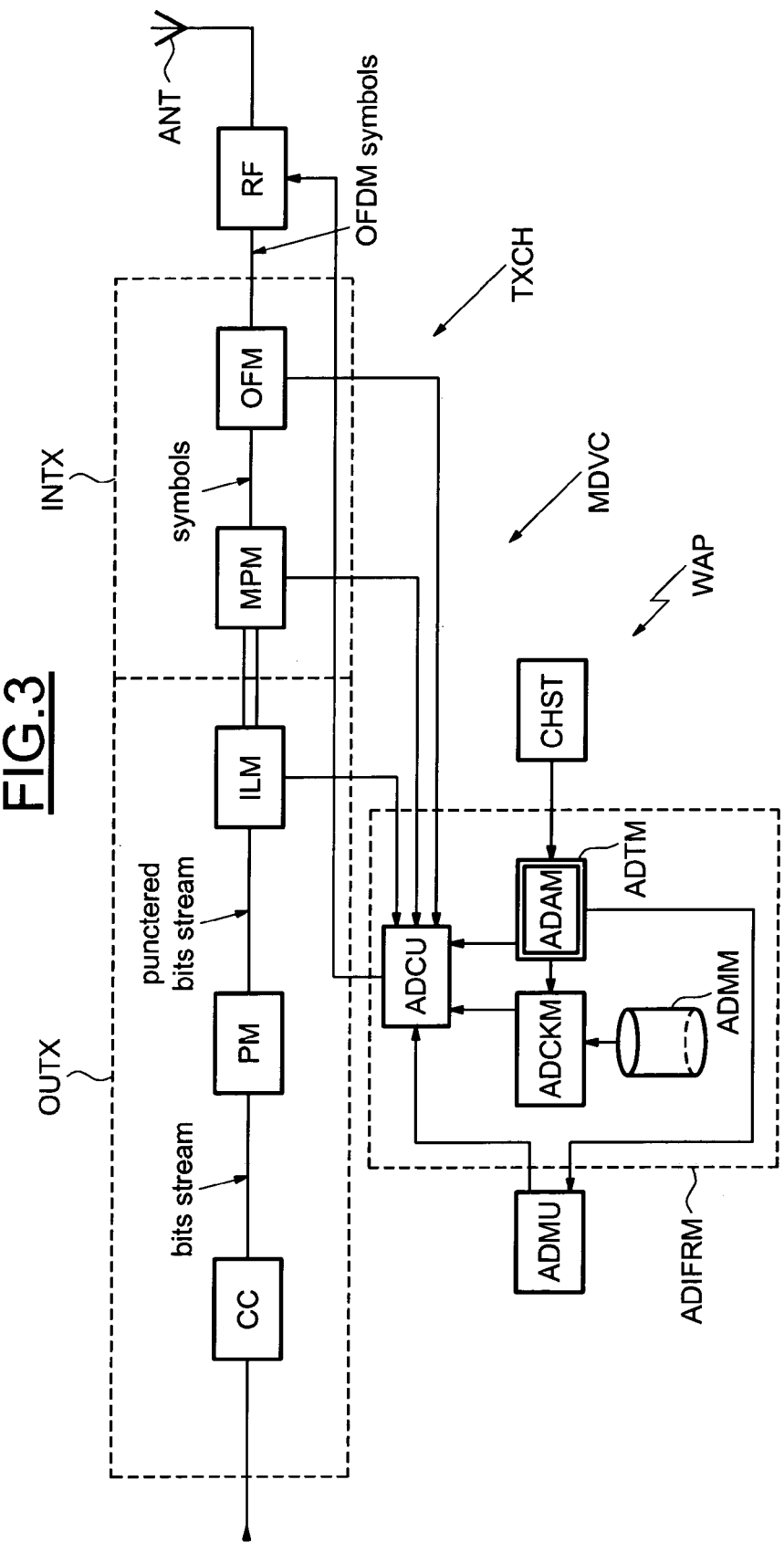
FIG. 3 illustrates in more detail the internal structure of a wireless communication apparatus according to the invention.

Of course, one skilled in the art may choose the frequency shift by taking into account the guard intervals of the MBOA hopping sub-bands, so that the interference generated by the main UWB device MDVC toward the auxiliary device XDVC are greatly reduced if not eliminated. In order to reduce this interference by using such a frequency shifting process, the main device MDVC of the wireless communication apparatus WAP comprises interference reduction means or circuitry ADIFRM cooperating with the transmission chain TXCH of the main device (FIG. 3).

In a conventional manner, the transmission chain TXCH comprises an outer transmission block OUTX including an encoder CC, for example, a convolutional encoder, receiving data from source coding means or coder and delivering a bit stream to puncturing means or circuitry PM which delivers a punctured bit stream.

The other conventional means of the transmission chain TXCH are interleaving means or an interleaver, ILM, followed by mapping means or a mapper MPM which maps the bits into symbols according to a modulation mapping scheme depending on the kind of modulation used, for example, a BPSK modulation or more generally a QAM modulation. The symbols are then delivered to an OFDM modulator OFM, which performs IFFT processing in order to associate each symbol to a sub-carrier and to form OFDM symbols. Each sub-carrier is modulated in accordance with the value of the corresponding symbol.

The OFDM symbols are then processed in a conventional radio frequency stage RF before being transmitted on air through antenna ANT. The mapping means MPM as well as the OFDM modulator OFM belong to an inner transmission block INTX of the transmission stage.

Figure 4:
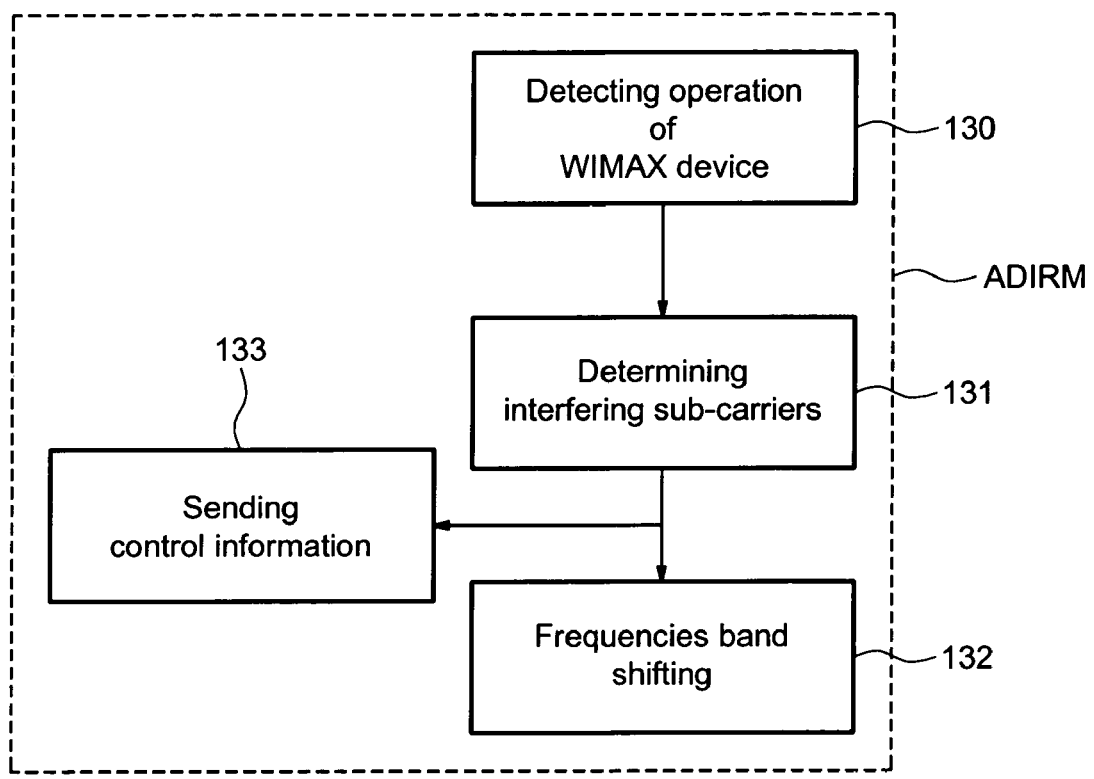
FIGS. 4-7 are flow charts related to an embodiment of a method of the invention.
Figure 5:
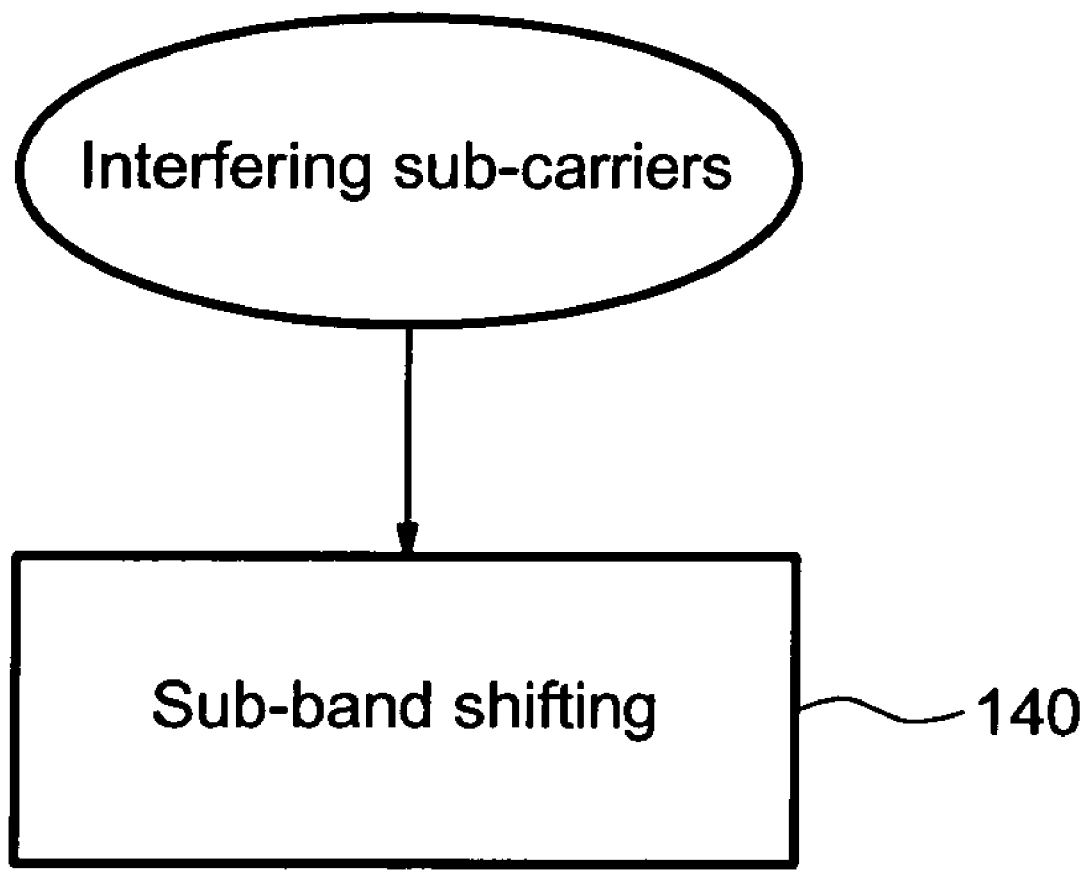
Figure 6:
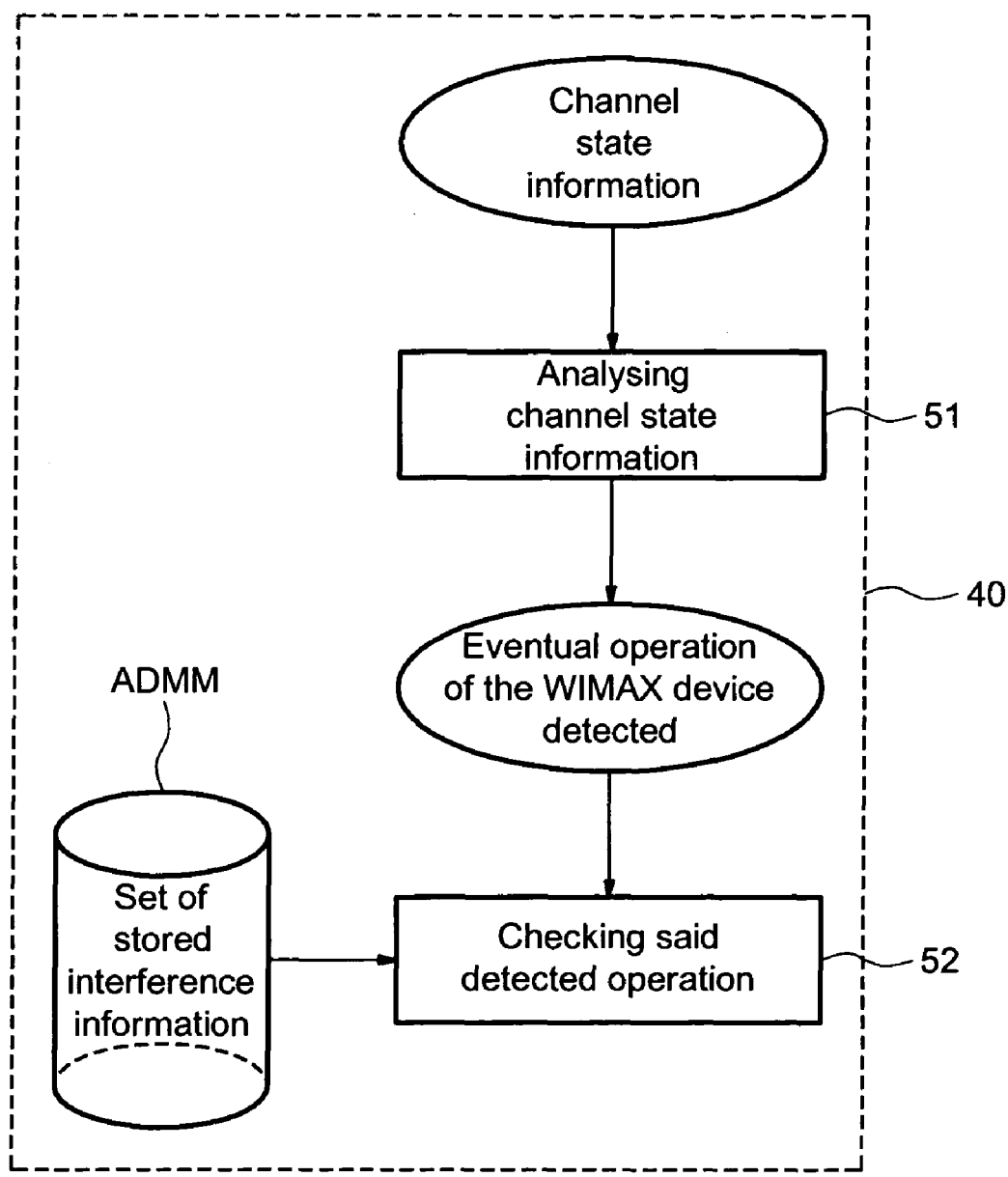

The operation of the interference reduction means ADIFRM, which are depicted in FIG. 3, will be described with reference to this FIG. 3, to FIG. 4, which depicts the interference reduction mode ADIRM performed by the interference reduction means, and also to FIGS. 5-7.

A conventional channel estimation unit CHST delivers channel state information in the frequency domain. This channel state information is an impulse response of the channel and contains, for example, energy peaks at some frequencies, detection means, ADTM, comprising analyzing means or an analyzer ADAM for analyzing the channel state information and detecting the operation of the auxiliary device XDVC (step 130 in FIG. 4).

It is helpful that the eventual operation of the WIMAX device detected by the analyzing step 51 of the channel state information (FIG. 6) be checked (step 52, FIG. 6) by checking means or checker ADCKM connected to a memory means or memory ADMM.

These memory means ADMM contain a set of stored interference information, in particular the interference information related to the auxiliary device XDVC. Most of these auxiliary devices are well defined and thus the bandwidth and the potential carrier frequencies in use are well known. This information is stored in the main memory means. Using this knowledge, interfering groups can be predefined and easily set up.

A control unit ADCU, connected to the main detection means, is able to determine a group of interference sub-carriers, for example by analyzing the channel state information. These interfering sub-carriers can be validated by the result of the checking operation performed by checking means ADCKM in accordance with the content of the memory means ADMM.

More precisely, if the group of interference sub-carriers determined by the control unit ADCU, by using the information given by the detection means ADTM, corresponds to pre-stored interfering frequencies, there is a high probability that the information given by the detection means actually corresponds to a well-defined auxiliary device, and not to noise on the air channel.

The control unit ADCU is provided not only for determining the group of the interfering sub-carriers (step 131 FIG. 4), but also for shifting at least a part of the main band of frequencies including the group of interfering sub-carriers, in accordance with a chosen frequency shift. More precisely, after having detected the operation of the WIMAX device and determining the interfering sub-carriers, the frequency band is shifted (step 132), for example by a sub-band shifting (step 140) (FIG. 5).

This frequency shifting is obtained by controlling the transposition frequency of the mixers contained in the radio frequency stage RF. It is helpful to indicate this frequency shift to all the devices of the UWB network which are in communication with the main device. This is performed, for example, by sending control information (step 133) to these devices. This control information can be sent by the MAC layer of the main device through control channels.

Figure 7:
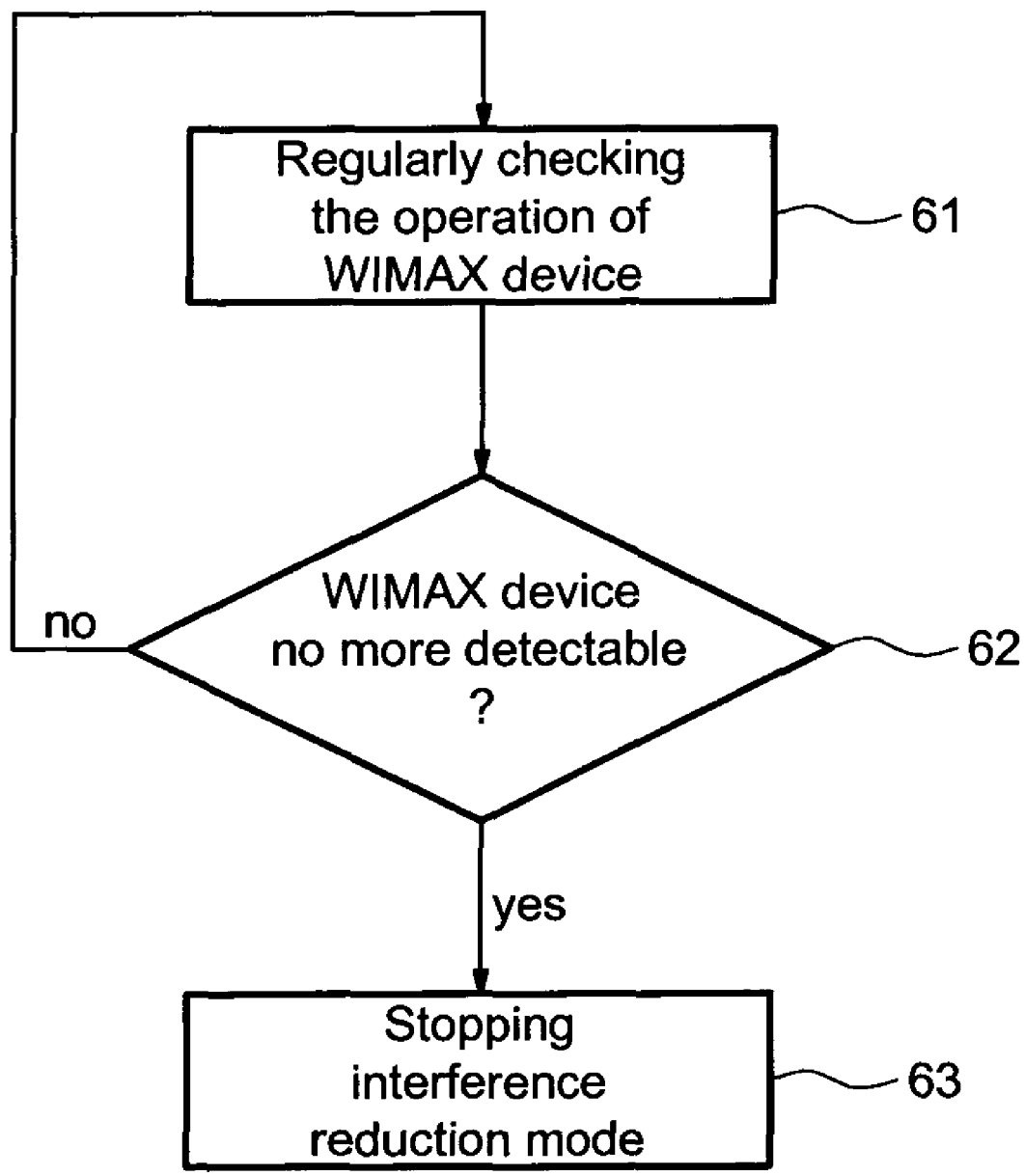

To improve the operation of the main device, it is preferable that the operation of the auxiliary device XDVC be regularly checked (step 61, FIG. 7). If the auxiliary device is not detectable (step 62), then the interference reduction mode is stopped (step 63).

In this respect, the wireless communication apparatus WAP further comprises a management unit ADMU adapted to manage the operation of the interference reduction means ADIFRM and to eventually stop its operation.

The interference reduction means ADIFRM may be, for example, implemented in the PHY layer of the main device. The management unit ADMU may also be implemented in the PHY layer although it would also be possible to implement management unit through software in the MAC layer.

Generally speaking, the control unit, the checking means, and the detection means may be realized by software within a control processor and/or by hardware.

It can be noted that according to this aspect, the frequency shifting permits the minimization, if not the elimination, of the interference generated by the main device MDVC towards the auxiliary device XDVC and additionally the interference generated by the auxiliary device XDVC towards the main device MDVC.

The sub-band shifting does not reduce the available resources on the air. The data rate needs not to be reduced. Thus no loss of communication performance occurs. The method according to this aspect can easily be combined with other mitigation techniques like power control and adaptive sub-carrier loading.

Figure 8:
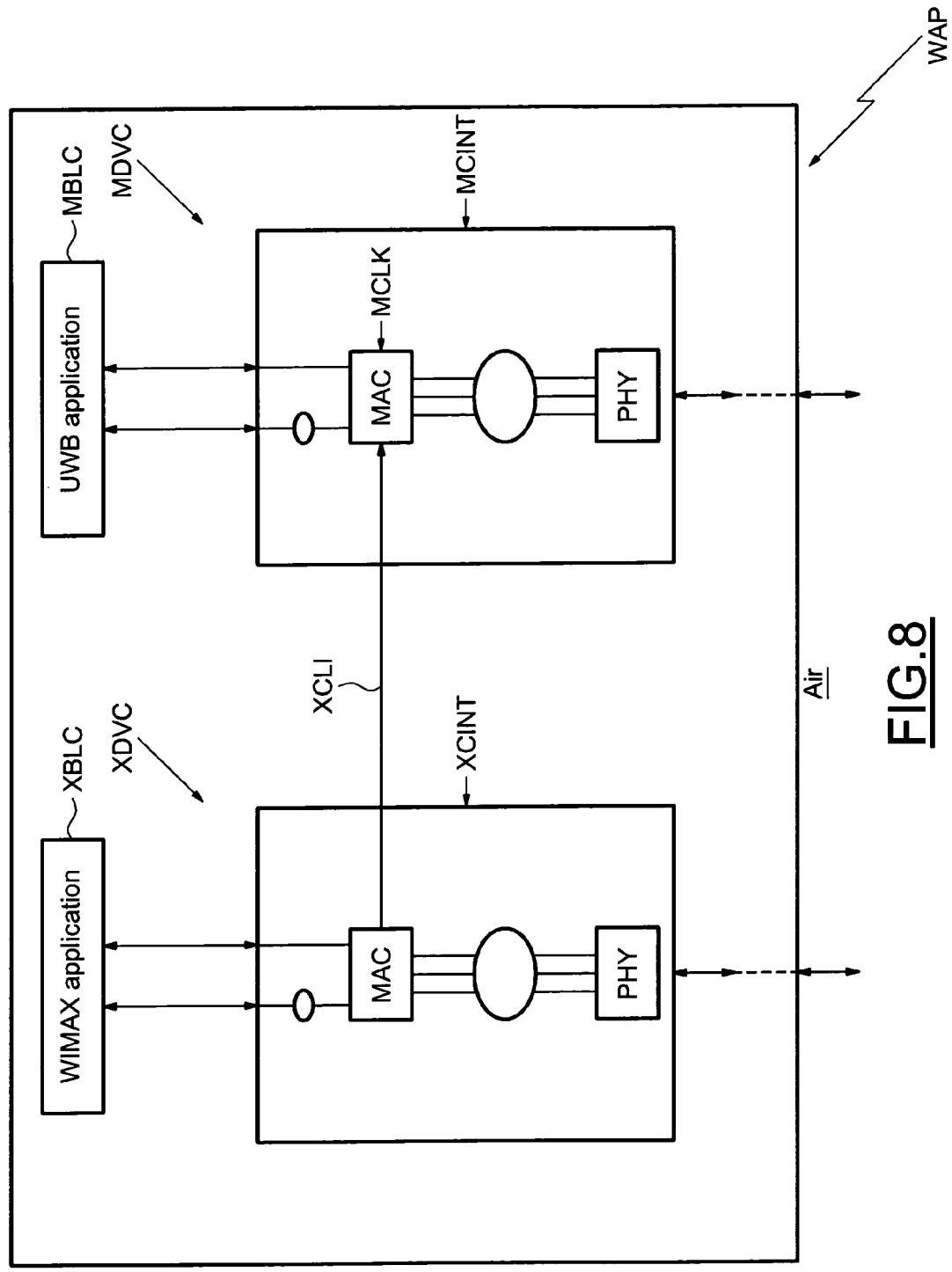
FIG. 8 illustrates another embodiment of a wireless communication apparatus according to the invention.

As illustrated in FIG. 8, it is possible that the wireless communication apparatus WAP incorporates both a main device MDVC and an auxiliary device XDVC. In such a case, the MAC layer of the auxiliary device XDVC is able to deliver to the management unit contained in the MAC layer of the main device MDVC an auxiliary control information XCLI representative of the operation or of the non-operation of the auxiliary device such that the management unit is adapted to allow the operation of the interference reduction means only during the operation of the auxiliary device.

Further, it is no more helpful to analyze the channel state information. As a matter of fact, the group of interfering sub-carriers is well known for this auxiliary device and pre-stored in the main memory means of the main device. Such an implementation of the invention allows for the simultaneous operation of, for example, a WIMAX or a mobile radio and WPAN UWB air interface in a single mobile terminal. The mutual interference may be minimized if not eliminated.

Although the auxiliary device has been described as being a WIMAX device, such an auxiliary device could belong to a mobile radio system defined by a mobile radio standard, like, for example, GSM, UMTS, CDMA, EDGE or future beyond IMT-2000 systems under development. An auxiliary device could also be a fixed satellite service (FSS) device or a general fixed wireless access device (FWA).

For an UMTS mobile radio device collocated with an UWB main device, the auxiliary control means which delivers the indication of the operation of the UMTS device can be incorporated in or connected to the well-known L2 and L3 entities of the UMTS device (This is valid for the collocation in general. The UWB device could be collocated with a WIMAX terminal, a satellite terminal or another mobile radio terminal.)

The invention claimed is:

1. A method for reducing interference in a single wireless communications device between a main device of the wireless communications device adapted to transmit information on sub-carriers having frequencies belonging to a main band of frequencies, and at least one auxiliary device of the mobile wireless communications device adapted to emit and receive information within an auxiliary band of frequencies, the auxiliary band being narrower than the main band and included within the main band, the main device and the at least one auxiliary device both being incorporated within a single housing of the single wireless communication device, the method comprising:

performing an interference reduction mode within the main device for reducing interference between the main device and the auxiliary device by at least detecting an emission from and/or a reception performed by the at least one auxiliary device by at least analyzing channel state information and detecting operation of the at least one auxiliary device from the channel state information, and checking the detection by using a set of stored interference information respectively associated with a set of several different auxiliary devices, determining from the detecting a group of at least one interfering sub-carrier having a frequency interfering with the auxiliary band of frequencies, and frequency shifting at least a part of the main band of frequencies, including the group of at least one interfering sub-carrier, with a frequency shift so that at least a part of the auxiliary band is excluded from the main band of frequencies; and performing the interference reduction mode comprises regularly checking the operation of the auxiliary device and if the auxiliary device is not detectable, the interference reduction mode concernin the non-detected auxiliary device is stopped.

2. A method according to claim 1, wherein the frequency shift is chosen so that the entire auxiliary band is excluded from the main band of frequencies.

3. A method according to claim 1, wherein the frequency shift is at least equal to a width of the frequency band of the at least one auxiliary device.

4. A method according to claim 1, wherein the main band of frequencies is subdivided into several different mutually spaced sub-bands, and frequency shifting comprises frequency shifting at least the sub-band which contains at least a part of the group of at least one interfering sub-carrier.

5. A method according to claim 1, wherein the main device comprises a transmission chain including a radio frequency stage including controllable transposition circuitry, and the frequency shifting comprises modifying the transposition frequency of the controllable transposition circuitry.

6. A method according to claim 1, wherein an indication of the group of at least one interfering sub-carrier, having a frequency interfering with the auxiliary band of frequencies of the auxiliary device, is stored and the detecting further comprises receiving from the auxiliary device control information representative of the operation or of the non-operation of the auxiliary device, such that the interference reduction mode is performed only during the operation of the auxiliary device.

7. A method according to claim 1, wherein the main device comprises at least part of a multi-carrier based Ultra Wide Band communication system.

8. A method according to claim 7, wherein the main device comprises at least part of an OFOM based Ultra Wide Band communication system.

9. A method according to claim 1, wherein the at least one auxiliary device comprises at least part of a fixed wireless access system or a mobile radio system.

10. A method according to claim 8, wherein the at least one auxiliary device comprises at least part of a fixed satellite service system.

11. A method for reducing interference between a main device adapted to transmit information on sub-carriers having frequencies belonging to a main band of frequencies, and at least one auxiliary device adapted to emit and receive information within an auxiliary band of frequencies, the main device and the at least one auxiliary device both carried by a common housing of a single wireless communication device, the auxiliary band being narrower than the main band and included within the main band, the method comprising:
performing an interference reduction mode within the main device for reducing interference between the main device and the auxiliary device by at least
detecting an emission from and/or a reception performed by the at least one auxiliary device, and checking the detection by using a set of stored interference information respectively associated with a set of several different auxiliary devices,
determining from the detecting a group of at least one interfering sub-carrier having a frequency interfering with the auxiliary band of frequencies, and
frequency shifting at least a part of the main band of frequencies, including the group of at least one, interfering sub-carrier, with a frequency shift so that at least a part of the auxiliary band is excluded from the main band of frequencies; and
performing the interference reduction mode comprises regularly checking the operation of the auxiliary device and if the auxiliary device is not detectable, the interference reduction mode concernin the non-detected auxiliar device is stopped.

12. A method according to claim 11, wherein the frequency shift is chosen so that the entire auxiliary band is excluded from the main band of frequencies.

13. A method according to claim 11, wherein the frequency shift is at least equal to a width of the frequency band of the at least one auxiliary device.

14. A method according to claim 11, wherein the main band of frequencies is subdivided into several different mutually spaced sub-bands, and frequency shifting comprises frequency shifting at least the sub-band which contains at least a part of the group of at least one interfering sub-carrier.

15. A method according to claim 11, wherein the main device comprises a transmission chain including a radio frequency stage including controllable transposition circuitry, and the frequency shifting comprises modifying the transposition frequency of the controllable transposition circuitry.

16. A single wireless communication apparatus, comprising:
a main device carried by a housing and having a main transmission chain for transmitting information on sub-carriers having frequencies belonging to a main band of frequencies;
interference reduction circuitry for reducing the interference between the main device and at least one auxiliary device carried by the housing and adapted to emit and receive information within an auxiliary band of frequencies being narrower than the main band and included within the main band;
said interference reduction circuitry including
detecting circuitry for detecting an emission from and/or a reception performed by the at least one auxiliary device, and
a control unit connected to the detecting circuitry for determining a group of at least one sub-carrier having frequencies interfering with the auxiliary band of frequencies, and for frequency shifting at least a part of the main band of frequencies including the group with a chosen frequency shift such that at least a part of the auxiliary band is excluded from the main band of frequencies; and
a management unit adapted to manage the operation of said interference reduction circuitry;
said interference reduction circuitry being adapted to regularly check the operation of the auxiliary device and if the auxiliary device is not detectable, said management unit is adapted to stop the interference reduction concerning the not detectable auxiliary device.

17. An apparatus according to claim 16, wherein the frequency shift is chosen so that the entire auxiliary band is excluded from the main band of frequencies.

18. An apparatus according to claim 16, wherein the frequency shift is at least equal to the width of the frequency band of the at least one auxiliary device.

19. An apparatus according to claim 16, wherein the main band of frequencies is subdivided into several different mutually spaced sub-bands, and the control unit is adapted to shift at least the sub-band which contains at least a part of the group of at least one sub-carrier having frequencies interfering with the auxiliary band of frequencies.

20. An apparatus according to claim 16, wherein the transmission chain comprises a radio frequency stage including controllable transposition circuitry, and the control unit is adapted to modify the transposition frequency of the transposition circuitry for performing the frequency shifting.

21. An apparatus according to claim 16, further comprising a channel estimation unit adapted to deliver a channel state information, wherein the detection circuitry comprises analyzing circuitry for analyzing the channel state information and detecting the operation of the at least one auxiliary device from the channel state information.

22. An apparatus according to claim 21, further comprising memory circuitry for storing a set of interference information respectively associated to a set of several different auxiliary devices, and checking circuitry for checking the operation detection by using the stored set of interference information.

23. An apparatus according to claim 16, further comprising a common housing carrying the main device and the at least one auxiliary device.

24. An apparatus according to claim 23, further comprising:
- a management unit adapted to manage the operation of the interference reduction circuitry; and
- memory circuitry for storing an indication of the group of at least one sub-carrier having frequencies interfering with the auxiliary band of frequencies of the auxiliary device;
- wherein the auxiliary device comprises auxiliary control circuitry for delivering an auxiliary control information representative of the operation or of the non operation of the auxiliary device, such that the management unit is adapted to allow the operation of the main interference reduction circuitry only during the operation of the auxiliary device.

25. An apparatus according to claim 16, wherein the main device comprises at least part of a multi-carrier based Ultra Wide Band communication system.

26. An apparatus according to claim 25, wherein the main device comprises at least part of an OFOM based Ultra Wide Band communication system.

27. An apparatus according to claim 25, wherein the main device has a physical layer incorporating the interference reduction circuitry.

28. An apparatus according to claim 16, wherein the at least one auxiliary device comprises at least part of a fixed wireless access system or to a mobile radio system defined by a mobile radio standard.

29. An apparatus according to claim 16, wherein the at least one auxiliary device comprises at least part of a fixed satellite service system.

* * * * *